J. C. Osgood,
Hose Coupling,
Nº 55,354.  Patented June 5, 1866.
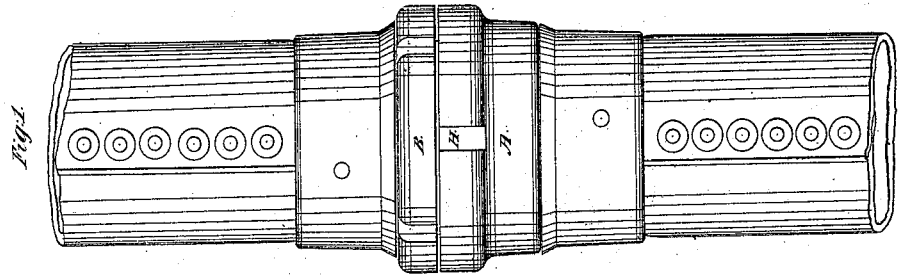
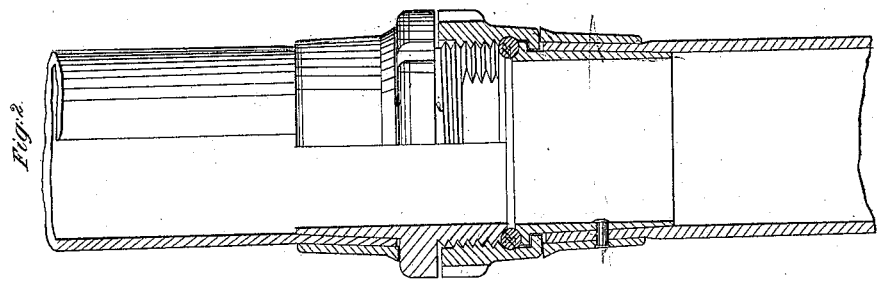
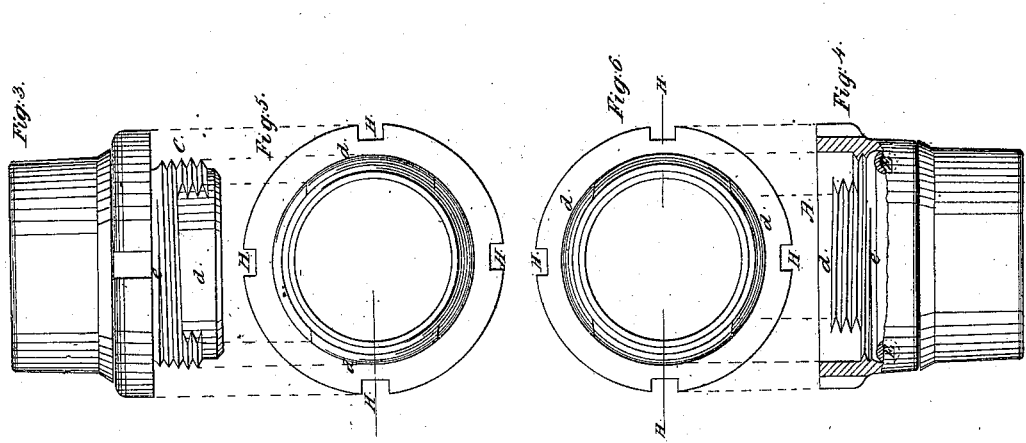
Witnesses:
Nelson Davenport
C. E. Davenport
Inventor:
Jason C. Osgood

UNITED STATES PATENT OFFICE.

JASON C. OSGOOD, OF TROY, NEW YORK.

IMPROVEMENT IN HOSE-COUPLINGS.

Specification forming part of Letters Patent No. 55,354, dated June 5, 1866.

*To all whom it may concern:*

Be it known that I, JASON C. OSGOOD, of the city of Troy, county of Rensselaer, and State of New York, have invented a new and Improved Mode of Constructing Couplings for Connecting Hose or Tubes; and I hereby declare that the following is a full and exact description thereof, reference being had to the accompanying drawings, and to the letters of reference marked thereon, of which—

Figure 1 is a side view of the coupling connected; Fig. 2, a view of a portion of the coupling connected, in which a portion of the threads are exposed, and also the packing in the groove. Fig. 3 is a side view of the screw, and Fig. 4 a side view of the nut. Figs. 5 and 6 are top views of the ends of the coupling.

The nature of my invention consists in constructing a coupling to connect and disconnect by a screw and nut, having double threads cut into said screw and nut, and a portion of said threads divided into two sections by cutting out at nearly right angles with said threads two equal separate quarters of two or more of said threads, and leaving two or more threads at the base of said screw and nut whole or undivided, so that when the two parts of said coupling are placed together for connection the two sections of threads of the screw will pass into the cut-out quarters of the threads of the nut, which will place the whole or undivided threads of the nut and screw at the base of each in such a position that they must catch, and by about a quarter-turn of the nut or screw the whole and the divided threads will lock, and by further turning the threads on the end of the screw will enter the full and uncut threads of the nut, and thus gain the strength of two or more full threads, forming a perfect and strong connection, by which means the process of coupling and uncoupling hose and tubes will be greatly facilitated and the labor in so doing materially lessened.

To enable others skilled in the art to make and use my invention, I will describe its construction and operation.

I construct the coupling boxes or shells A and B of brass or other suitable material in about the ordinary form. One of said shells is a hollow nut, A, made to revolve around a tube and retained thereon by a shoulder or flange, as in the ordinary screw-coupling. The other box or shell is for the screw C, as in the ordinary screw-coupling; but instead of cutting the threads of said screw and nut in the ordinary and usual form, I cut in the nut A and on the screw C double threads, and then cut out at nearly right angles with said threads, or perpendicular to said screw and nut, two separate quarters of two or more of the threads of said nut and screw, (Figs. 3, 4, 5, 6, letter *d*,) leaving one or more whole threads at the base of said nut and screw, (Figs. 2, 3, and 4, letter *e*,) thus making the upper portion of the threads on the said screw and nut into two sections.

Around the inner base of the nut A, I construct or cut out a groove, E, into which I place a round packing of rubber or other suitable material for the purpose of making the coupling more water-tight. A square or other shaped packing may be used, or the ordinary rings of leather and rubber packing may be used; but the difficulty with the ordinary packing is that it is liable to and will frequently drop out when the coupling is disconnected, whereas the round rubber packing sprung into a groove, as herein described, will remain in its place and not drop out.

No mistakes can be made nor time wasted in locking the proper threads of the screw and nut, because the screw will not enter the nut until the sections of the upper threads of the screw arrive opposite the cut-out quarters of the threads of the nut, when the screw will drop into the nut, and the whole or uncut threads at the base of the screw and nut, by a slight turn, will properly lock, and by about a quarter-turn of the screw or nut the coupling will be securely locked by the whole or undivided threads at the base of the screw and nut and the sections of the threads of the screw and nut. If more than a quarter-turn be made with the screw or nut, or if the screw and nut be turned as closely as the shells of the couplings will admit, the strength of the connection will not be diminished nor the number of threads holding such connection be decreased.

On the outer side of the shells I cut slots or holes H, for the purpose of connecting and disconnecting the coupling by means of a wrench, when the use of the same might be necessary.

The hose or tube is connected to the coupling shell and tube of the nut by means of screws and rivets and other means, as ordinarily connected

What I claim as my invention, and desire to secure by Letters Patent, is—

The screw and nut cut with double threads and leaving two or more of said double threads at the base of the screw and nut whole or uncut, in combination with the division into sections of the upper threads of the screw and nut, substantially as and for the purposes as herein set forth.

JASON C. OSGOOD.

Witnesses:
NELSON DAVENPORT,
C. E. DAVENPORT.